United States Patent [19]
Fletcher et al.

[11] 3,752,564
[45] Aug. 14, 1973

[54] OPTICAL DATA PROCESSING USING PARABOLOIDAL MIRROR SEGMENTS

[76] Inventors: James C. Fletcher, Administrator of the National Aeronautics and Space Administration with respect to an invention of; Akram S. Husain-Abidi, Greenbelt, Md.

[22] Filed: Feb. 22, 1972

[21] Appl. No.: 228,190

[52] U.S. Cl.............................. 350/162 SF, 350/55
[51] Int. Cl. .......................................... G02b 27/38
[58] Field of Search ................ 350/162 SF, 55, 293, 350/294, 175 TS, 3.5; 356/71

[56] References Cited
UNITED STATES PATENTS

| | | | |
|---|---|---|---|
| 3,438,693 | 4/1969 | Cook............................ | 350/162 SF |
| 2,860,557 | 11/1958 | Moore et al................... | 350/175 TS |
| 3,062,101 | 11/1962 | McCarthy....................... | 350/55 |
| 3,578,846 | 5/1971 | Chen............................. | 350/162 SF |

OTHER PUBLICATIONS

Gamblin, IBM Technical Disclosure Bulletin, Vol. 12, No. 4, September, 1969, pp. 580-581.

*Primary Examiner*—David Schonberg
*Assistant Examiner*—Ronald J. Stern
*Attorney*—R. F. Kempf, John R. Manning et al.

[57] ABSTRACT

An optical data processing system using paraboloidal reflecting surfaces is disclosed. In the preferred embodiment the paraboloidal reflecting surfaces are segments of a paraboloidal mirror. A source of coherent light is in the focal plane of the first paraboloidal mirror segment which collimates the beam and reflects it toward a second paraboloidal mirror surface. The information to be analyzed, on a transparency for example, is placed in the collimated beam. The beam is reflected from the second paraboloidal mirror segment and focused on a Fourier transform plane. A photon detector could be placed in the Fourier transform plane or suitable spatial filters can be placed thereat, with the filtered beam then being reflected from a third paraboloidal mirror segment to be focused on a reconstruction plane.

5 Claims, 3 Drawing Figures

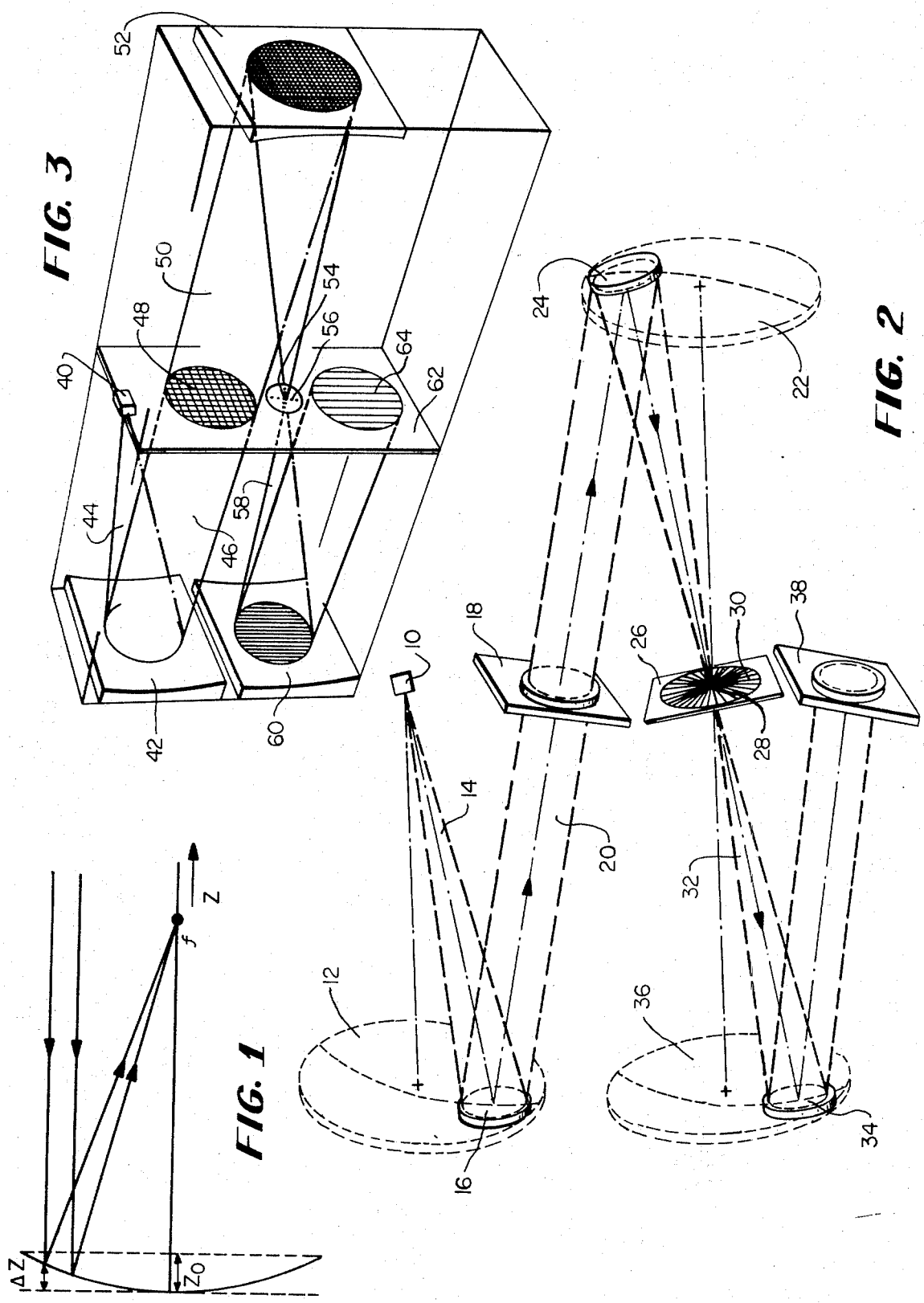

OPTICAL DATA PROCESSING USING PARABOLOIDAL MIRROR SEGMENTS

ORIGIN OF THE INVENTION

The invention described herein was made in the performance of work under a NASA contract is subject to the provisions of Section 305 of the National Aeronautics and Space Act of 1958, Public Law 85–568 (72 Stat. 435; 42 U.S.C. 2457).

BACKGROUND OF THE INVENTION

This invention relates to optics and more particularly to an optical data processing system.

The published account of optical data processing techniques goes as far back as 1873 when Ernst Abbe demonstrated in his classical paper that the diffraction pattern in the focal plane of a lens has all the properties and characteristics of a two-dimensional Fourier transform of the light distribution in the input information which is placed a focal length away from the lens. Abbe also realized that spatial filtering can be achieved by blocking the appropriate portion of the diffraction pattern of a picture. Lenses were exclusively used to produce the diffraction pattern in their focal planes. In the early twentieth-century experimental evidence of spatial filtering by manipulating the diffraction pattern in the Fourier transform plane to enhance or suppress certain features of the input information was reported. Later, it was shown that the optical analogue of a number of electrical concepts such as edge-sharpening and detection of periodic and isolated signals in the presence of noise can conveniently be performed.

Earth resources satellites and the earth resources experiments on-board space stations will sense a very large number of images. According to a rough estimate, the total rate of information may be as high as $10^{12}$ bits per second. In order to extract usable information from this enormous amount of data, optical data processing techniques are ideally suited since they have two degrees of freedom as contrasted with electronic techniques which have inherently only one degree of freedom. Optical techniques are extremely useful for the performance of linear mathematical operations such as spectral analysis, complex spatial filtering, matched filtering and auto and cross-correlation. Furthermore, an on-board spacecraft optical data processing system would be extremely useful since it will allow transmission of only the processed data rather than the data itself, resulting in an enormous saving of transmitter bandwidth. In a typical optical system normally used for coherent optical data processing, light from a helium-neon laser radiating at 6,328A wavelength is brought to a point focus by a microscope objective. A pinhole is placed in this focal plane to eliminate laser beam noise and to exclude stray light. Another lens is placed a focal length away from this plane to collimate the laser light. The input information is then placed a focal length away from a converging lens. This lens in its focal plane produces the Fraunhofer diffraction pattern of the input information in two dimensions. This diffraction pattern has all the characteristics of a two-dimensional Fourier transform of the light distribution in the input information. If an arbitrary function is introduced in the input plane a two-dimensional spectrum of that function can be obtained in the Fourier transform plane. Spatial frequency filtering can also be performed in the Fourier transform plane by manipulating the diffraction pattern. If a complex spatial filter is placed in the Fourier transform plane, the system can be used for auto or cross-correlation purposes.

This optical system works well in the laboratory environment and has been used for spectrum analysis, spatial and complex spatial filtering and auto or cross-correlation purposes. In order to process the data on board a spacecraft, such a system would have two main drawbacks. The first is the low efficiency and bulky He-Ne gas laser and the second is the axial symmetry of the optical system.

A solid state gallium arsenide laser has been used to overcome the first drawback. This laser is at least 10,000 times better in efficiency and probably the same order of magnitude smaller in overall size. Furthermore, in a Ga As laser system the microscopic lens and pinhole spatial filter is not required, thereby resulting in the minimizing of optical alignment problems.

The second of the main drawbacks has remained unsolved and has become a stumbling block in the further utilization of optical data processing systems in spacecraft. In addition, certain other important problems are created by the use of lenses which also have hitherto remained unsolved. A brief discussion of these problems associated with a lens system is in order.

The quality and resolution of Fourier transform relationship in the focal plane of the lenses is very much affected by the lens aberrations and the optical refracting material. Among the aberrations the following four are primarily responsible for the degradation of Fourier relationship:

i. Spherical aberration
ii. Chromatic aberration
iii. Astigmatism
iv. Coma

Beside overcoming these aberrations the other severe problem is the choice of the proper optical material. For an ultra-high quality lens suitable for data processing, the optical material should be:

i. Optically homogeneous to a very high degree. It is very important that the refractive index of the lens be constant throughout the material.
ii. Free from thermal and mechanical strains.
iii. Optically Isotropic, i.e., the index of refraction at any point must be constant regardless of the direction in which the radiation is passing the point. Therefore, for a good optical system with lenses it is necessary to rectify all the aberrations and one should also cope with the selection of proper optical material. Both of these problems are extremely difficult to rectify and costs are astronomical. The other two disadvantages are the front surface reflections which are unavoidable and the axial symmetry of the system, i.e., the optical system with lenses cannot be folded and therefore is a problem for spacecraft purposes.

SUMMARY OF THE INVENTION

It is, therefore, an object of the present invention to provide an optical data processing system free of the aforementioned and other such disadvantages.

It is a primary object of the present invention to provide an optical data processing system having a Fourier transforming component which is free from spherical and chromatic aberrations.

It is another object of the present invention to provide an optical data processing system having a Fourier transforming component which is free of front surface reflections.

It is yet another important object of the present invention to provide an optical data processing system which can be folded resulting in a considerable saving of space.

It is a further object of the present invention to provide an optical data processing system wherein astigmatism and coma can be minimized.

It is still another object of the present invention to provide an optical data processing system which can operate using electromagnetic waves of any frequency.

Accordingly, in order to implement these and still further objects of the present invention, which will become more readily apparent as the description thereof proceeds, it should be noted that the optical data processing system of the present invention broadly comprises a source of coherent light, a first paraboloidal reflecting surface defining light collimating means, the source of coherent light being in the focal plane of the first paraboloidal reflecting surface and directed thereat, modulating means for modulating the light in accordance with information to be analyzed, and a second paraboloidal reflecting surface defining means for converting an image to its Fourier transform, the first paraboloidal reflecting surface directing the coherent light as a collimated beam toward the second paraboloidal reflecting surface, the modulating means being placed in the collimated beam, at a distance from the second paraboloidal reflecting surface equal to its focal length to thereby produce an information-modulated light beam, the second paraboloidal reflecting surface thereby converting the information-modulated light beam into a diffraction pattern having the properties of the Fourier transform of the information and focusing the diffraction pattern in a plane centered on the focal point of the second paraboloidal reflecting surface. In specific embodiments, photon detector means can be disposed in the Fourier transform plane and/or spatial filter means could be disposed in the Fourier transform plane. A third paraboloidal reflecting surface is then provided to reconstruct the image at an image reconstruction plane. The paraboloidal reflecting surfaces are provided by paraboloidal mirrors and, in accordance with another aspect of the present invention, are defined by segments of a paraboloidal mirror.

BRIEF DESCRIPTION OF THE DRAWINGS

This invention will be better understood, and objects other than those set forth above will become apparent, when consideration is given to the following detailed description. Such description refers to the annexed drawings presenting preferred and illustrative embodiments of the invention. In the drawings:

FIG. 1 is a diagrammatic view illustrating the transfer function for a parabolic mirror;

FIG. 2 is a schematic depiction of an optical data processor according to the present invention; and FIG. 3 is a perspective view of an optical data processor according to the present invention.

DETAILED DESCRIPTION OF A PREFERRED INVENTIVE EMBODIMENT

Considering first the paraboloidal mirror as a linear element in an optical data processing system, and referring to FIG. 1, light rays entering from the right parallel to the Z-axis are reflected from the mirror and intersect the Z-axis at the focal point f. The relationship between the incident and reflected scalar light fields at any point in the $(x, y, z_0)$ plane can be described in terms of a transfer function, $t(x, y, z_0)$. For mirrors, (as well as for lenses) the transfer function is strictly a phase function, and we have $$t(x, y, z_0) = e^{j\phi\,(x,y,z_0)} = e^{jk\Delta\,(x,y,z_0)} \quad (1)$$

The term $\phi\,(x, y, z_0)$ is the phase difference in radians between the incident and reflected fields, $k$ is the wave number $2\overline{\lambda}/\lambda$ and $\Delta\,(x, y, z_0)$ is the difference in path lengths between the incident and reflected waves.

Again referring to FIG. 1, we see that the total path difference is $$\Delta\,(x, y, z_0) = 2(z_0 - \Delta z) \quad (2)$$

(this assumes no ray bending to the left of the $(x,y,z_0)$ plane, analogous to the thin lens approximation in lens analysis).

Now from the equation for a paraboloid of revolution, $$\Delta z = (x^2 + y^2)/4f \quad (3)$$

therefore $$t(x, y, z_0) = e^{jk\Delta\,(x,\,y,\,z_0)} = e^{j2kz_0}\, e^{-jk\,[(x^2 + y^2)/2f]} \quad (4)$$

In the case of a spherical thin lens, if the paraxial approximation is made, i.e., we consider only light rays close to the lens axis, the transfer function is found to be:

$$t(x, y, z_0) = e^{jknz_0}\, e^{-jk\,[(x^2 + y^2)/2f]} \quad (5)$$

Here $n$ is the index of refraction of the lens material, and $z_0$ is the lens thickness along the optical axis. It is important to note that the focal length $f$ of a lens is a function of the index of refraction to the lens material.

Referring to the derivation of the transfer function, several points for the parabolic mirror as a system element can be made. First, since the focal length $f$ of a mirror is not a function of index of refraction, the parabolic mirror system will not have the chromatic aberration that is inherent in the lens system.

Secondly all the light rays parallel to the z-axis will intersect the point $f$ for a parabolic mirror, while only the paraxial rays will intersect the focal point for a spherical lens. This means that the parabolic mirror is inherently free from spherical aberrations (while the lens, of course, is not).

The absence of paraxial approximation for mirrors has several practical advantages, such as, that the aperture of the optical signal being processed can be larger for a parabolic mirror than for a lens of the same diameter. More importantly, it means that one can cut out off-axis segments from a parabolic mirror, and these segments will have the same transforming properties of the original mirror and the same relative axis. Thus one can construct a folded optical processing system.

Two other aberrations also deserve some attention. Let us consider astigmatism. This aberration arises when the incoming light rays make a large angle with the Z-axis of a mirror. This is not a serious drawback, however, since for most optical signal processing, the incoming light is a coherent plane wave whose rays are parallel to Z-axis. Furthermore all interelement light paths can be kept at very small angles with respect to the element axes. Astigmatism therefore, can be made negligible in a parabolic processing system.

The second aberration is coma, the aberration that occurs for light rays at small angles to the Z-axis. In experiments using parabolic mirrors as Fourier transforming elements, the effects of coma were not observable at the normal working angles.

Turning now to FIG. 2, there is illustrated an optical data processing system using paraboloidal mirror segments. The coherent light source 10 is a p-n gallium arsenide laser with an effective radiating area of 3 mils. The laser operates at room temperature at a wavelength of 9,000A. It is placed in the focal plane of paraboloidal mirror 12. The coherent monochromatic light 14 from the Ga As laser diverges and typically forms a 30° angle. The coherent light source 10 is almost a point source and since it is in the focal plane of the paraboloidal mirror 12, the light reflecting from the paraboloidal mirror segment 16 is collimated.

To perform a two-dimensional spectrum analysis the information to be analyzed is recorded on a transparency either by taking the photograph or by electronically generating the object image. The transparency 18 is placed in the collimated beam 20 and is a focal length away from the paraboloidal mirror 22. The paraboloidal mirror segment 24 converts the information of transparency 18 into a diffraction pattern that has all the properties of its Fourier transform in the plane 26 centered at the point 28 which is the focal point of paraboloidal mirror 22. The information in the diffraction pattern can be converted into electrical signals by placing an appropriate photon detector 30 in the plane 26. The photon detector 30 could be of any suitable geometry such as in the form of wedges or concentric rings.

Alternatively, spatial filtering can be performed in the plane 26. For example, the two basic tyes of filtering, namely band path and band stop, can be performed by having a transparent or an opaque region at a desired place in the plane 26. Optical filters in the form of wedges, annular ring, or opaque discs may be used in the plane 26. The light transmitting through the filter/detector 30 is reflected by a paraboloidal mirror segment 34 of paraboloidal mirror 36 placed a focal length away from the plane 26. The input information is reconstructed at the plane 38 which is a focal length away from the paraboloidal mirror 36. This system satisfies two well-known requirements. First, the Fraunhofer diffraction of an aperture is the two dimensional Fourier transform of the transmission function of that aperture, and second, the Fourier transform of any function is independent of that function with the exception of the case of a linear phase factor.

Referring to FIG. 3, there will be seen a complete system which is compact and compatible with other equipment. A Ga As laser 40 is located in the focal plane of paraboloidal mirror segment 42 and directs the beam 44 thereat. The collimated beam 46 passes through modulating means 48 which contains the information to be analyzed. The modulated beam 50 is converted by the second paraboloidal mirror segment 52 to form the diffraction pattern 54 at the Fourier transform plane. A photon detector and/or spatial filter 56 is placed at the Fourier transform plane and the filtered beam 58 is directed by the third paraboloidal mirror segment 60 to be reconstructed at reconstruction plane 62. In the simple illustration of FIG. 3, the information to be analyzed is depicted as a grid at 48. The spatial filter 56 filters out the horizontal structure of the Fourier transform so that only the vertical structure is allowed to pass through the Fourier transform plane. The vertical structure is, therefore, reconstructed as image 64 at reconstruction plane 62. All three of the off-axis paraboloidal mirror segments are carved within a block of a suitable material.

The advantages of the optical data processing system of the present invention using off-axis paraboloidal mirror segments are several-fold. First, the paraboloidal mirror segments are inherently free from spherical and chromatic aberrations and provide a system which is free of front surface reflections. The optical system can be folded resulting in a considerable saving of space. Additionally, astigmatism and coma can be minimized to a far greater extent than in lenses. Also, since the light does not have to pass through the material of a front surface reflecting paraboloidal mirror, it is not necessary that optical material for fabrication purposes should be homogeneous and isotropic. Thus, it is immediately apparent that the use of paraboloidal mirrors overcomes all the critical optical material limitations. Finally, the present invention provides a method for performing optical data processing using electromagnetic waves of any frequencies. Lenses for ultraviolet, infrared, radio frequencies are very difficult to fabricate, if not impossible.

In another embodiment of the present invention an optical correlator was constructed using paraboloidal mirror segments. In this device an input transparency was placed in the input plane. The second paraboloidal mirror segment then produced the Fraunhofer diffraction pattern of the input image in the complex spatial filter plane where a Fourier transform hologram is recorded.

Another paraboloidal mirror segment is used to Fourier transform the field transmitted by the hologram. The correlation plane which is located a focal length away from the last-mentioned Fourier transforming paraboloidal mirror segment displays the convolution, geometrical image and correlation function.

It should be apparent from the foregoing detailed description that the objects set forth hereinabove have been successfully achieved. Moreover, while there is shown and described a present preferred embodiment of the invention, it is to be distinctly understood that the invention is not limited thereto but may be otherwise variously embodied and practised within the scope of the following claims. Accordingly,

What is claimed is:

1. An optical data processing system comprising:
   a. a source of coherent light;
   b. a first paraboloidal reflecting surface defining light collimating means;
   c. said source of coherent light being in the focal plane of said first paraboloidal reflecting surface and directed thereat;
   d. modulating means for modulating the light in accordance with information to be analyzed;
   e. a second paraboloidal reflecting surface defining means for converting an image to its Fourier transform;
   f. said first paraboloidal reflecting surface directing said coherent light as a collimated beam toward said second paraboloidal reflecting surface;
   g. said modulating means being placed in said collimated beam, at a distance from said second paraboloidal reflecting surface equal to its focal length to thereby produce an information-modulated light beam;

h. said second paraboloidal reflecting surface thereby converting said information-modulated light beam into a diffraction pattern having the properties of the Fourier transform of said information and focusing said diffraction pattern in a plane centered on the focal point of said second paraboloidal reflecting surface;

i. spatial filter means disposed in said plane centered on the focal point of said second paraboloidal reflecting surface to filter said diffraction pattern; and j. a third paraboloidal reflecting surface defining image reconstruction means whereby said diffraction pattern is filtered and reflected by said third paraboloidal reflecting surface onto an image reconstruction plane located at a distance therefrom equal to its focal length;

k. said first, second, and third paraboloidal reflecting surfaces being defined by off-axis segments of a paraboloidal mirror.

2. A system as defined in claim 1, wherein said filter is a band pass filter.

3. A system as defined in claim 1, wherein said filter is a band stop filter.

4. A system as defined in claim 1, wherein said source of coherent light is a laser.

5. A system as defined in claim 4, wherein said laser is a p-n gallium arsenide laser.

* * * * *